United States Patent [19]

Marich et al.

[11] Patent Number: 5,245,891
[45] Date of Patent: Sep. 21, 1993

[54] TRANSMISSION RESERVOIR

[75] Inventors: Randall M. Marich, Howell; James R. Cullen, Ypsilanti, both of Mich.

[73] Assignee: General Motors Corporation, Detroit, Mich.

[21] Appl. No.: 996,279

[22] Filed: Dec. 24, 1992

[51] Int. Cl.$^5$ .............................................. F16H 57/04
[52] U.S. Cl. .................................................. 74/606 R
[58] Field of Search ........................... 74/606 R, 606 A

[56] References Cited

U.S. PATENT DOCUMENTS

| | | | |
|---|---|---|---|
| 1,324,353 | 12/1919 | Jencick | 74/606 R |
| 1,572,102 | 2/1926 | Braunsdorf | 74/606 R |
| 2,408,923 | 10/1946 | Frederick | 74/606 R |
| 4,995,971 | 2/1991 | Droste et al. | 74/606 R X |
| 5,062,447 | 11/1991 | Davison, Jr. et al. | 74/606 R X |
| 5,182,966 | 2/1993 | von Kaler et al. | 74/606 R X |

FOREIGN PATENT DOCUMENTS

| | | | |
|---|---|---|---|
| 621279 | 9/1926 | France | 74/606 A |
| 4-113062 | 4/1992 | Japan | 74/606 R |
| 91/04427 | 4/1991 | World Int. Prop. O. | 74/606 R |

*Primary Examiner*—Rodney H. Bonck
*Assistant Examiner*—Ryan W. Massey
*Attorney, Agent, or Firm*—Donald F. Scherer

[57] ABSTRACT

A closure or bottom pan for a transmission provides a reservoir in which excess system fluid is stored. The bottom pan has a waffle pattern bottom wall.

4 Claims, 3 Drawing Sheets

TRANSMISSION RESERVOIR

TECHNICAL FIELD

This invention relates to closures for transmission cases, and more particularly, to bottom pans for transmissions providing a closure and a reservoir.

BACKGROUND OF THE INVENTION

Power transmissions, particularly automatically shifted transmissions have a bottom pan or reservoir in which hydraulic fluid is stored. An input driven pump transports hydraulic fluid from the reservoir to the various control apparatus and lubrication passages in the transmission.

During the manufacture of the transmission, it is possible that debris, such as metal chips, can be retained in passages or hollows of some of the components, and flushed into the reservoir after assembly. The inlet to the pump has a filter designed to prevent the debris from reentering the system. However, during operation, if high fluid demand is made or the filter is partially blocked, a bypass on the filter can be opened thus allowing the debris to be recirculated.

While the occurrence of such recirculation is rare, it is preferred to protect against this recirculation. As a general rule, transmissions have been equipped with a magnet in the bottom pan to collect the magnetic particles which are perceived to exhibit the most detrimental affect. There are, however, some nonmagnetic items such as friction facing fibers and aluminum chips found in the transmission. Some secondary filtration has been suggested to control the nonmagnetic debris.

SUMMARY OF THE INVENTION

The present invention seeks to prevent the recirculation of the debris without the use of magnets or secondary filtration. The present invention provides a waffle patterned bottom wall to the hydraulic fluid in the reservoir. The waffle pattern establishes a plurality of wells that permit any extraneous debris, such as chips and fibers, to settle to the reservoir bottom. The waffle pattern inhibits movement of the debris once it has settled in any of the wells, regardless of the flow velocity of the hydraulic fluid across the upper extremities of the waffle pattern.

The waffle pattern bottom also provides increased rigidity for the bottom pan and permits the use of thinner material as the base stock, thus saving money and weight in the transmission production.

It is an object of the present invention to provide an improved transmission bottom pan having a surface with a debris retention texture.

It is another object of this invention to provide an improved transmission bottom pan having a surface with a waffle pattern for creating debris collecting areas.

It is a further object of this invention to provide an improved reservoir in a transmission assembly wherein a bottom pan is provided with a waffle pattern surface for establishing a plurality of wells or debris collecting areas to restrict the circulation of debris from the reservoir to the hydraulic control system.

These and other objects and advantages of the present invention will be more apparent from the following description and drawings.

DESCRIPTION OF THE EXEMPLARY EMBODIMENTS

Figure 1:
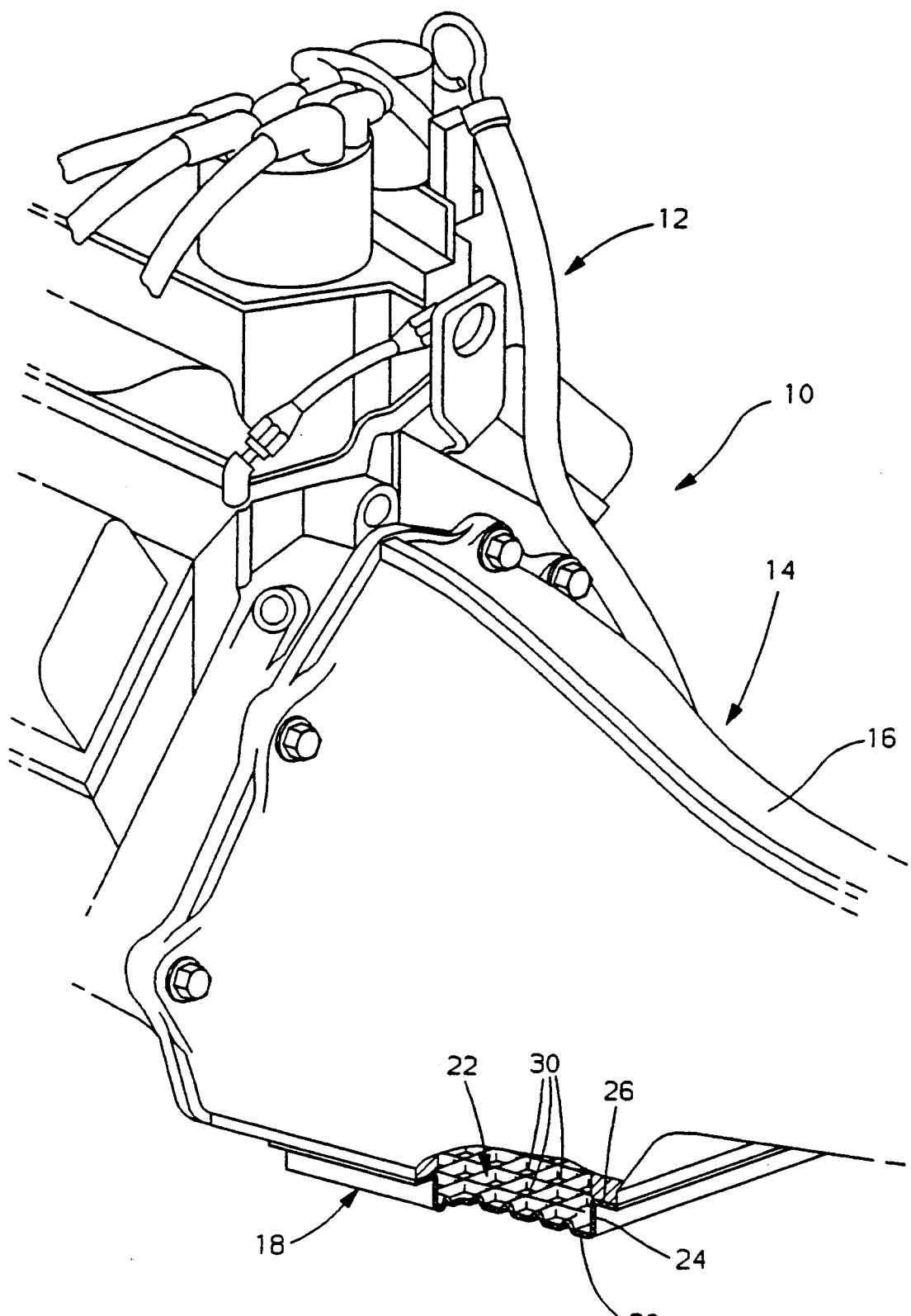
FIG. 1 is a perspective view of an engine and transmission, wherein the transmission incorporates a waffle pattern bottom pan.

Referring to the drawing, wherein like characters represent the same or corresponding parts throughout the several views, there seen in FIG. 1 a powertrain, generally designated 10, having an engine 12 and a transmission 14. The engine 12 and transmission 14 are conventional structures which are well known in the art and provide for the transmission of power to the drive wheels of a vehicle, not shown.

The engine transmission combination, as shown in powertrain 10, has longitudinal type powertrain wherein the drive output from the transmission is substantially parallel with the longitudinal axis of the vehicle. The transmission could also be shown as a transverse type wherein the output shafts of the transmission are transverse to the longitudinal axis and is generally utilized as a front wheel drive type of arrangement.

The transmission 14 includes a housing 16 in which the gearing members and clutches of the transmission are disposed, and a bottom pan 18 which serves as a closure for the lower surface of the housing 16 and provides a reservoir for hydraulic fluid which is stored when not being used to energize the various clutches and brakes, or provide lubrication and cooling in the transmission components.

Figure 2:
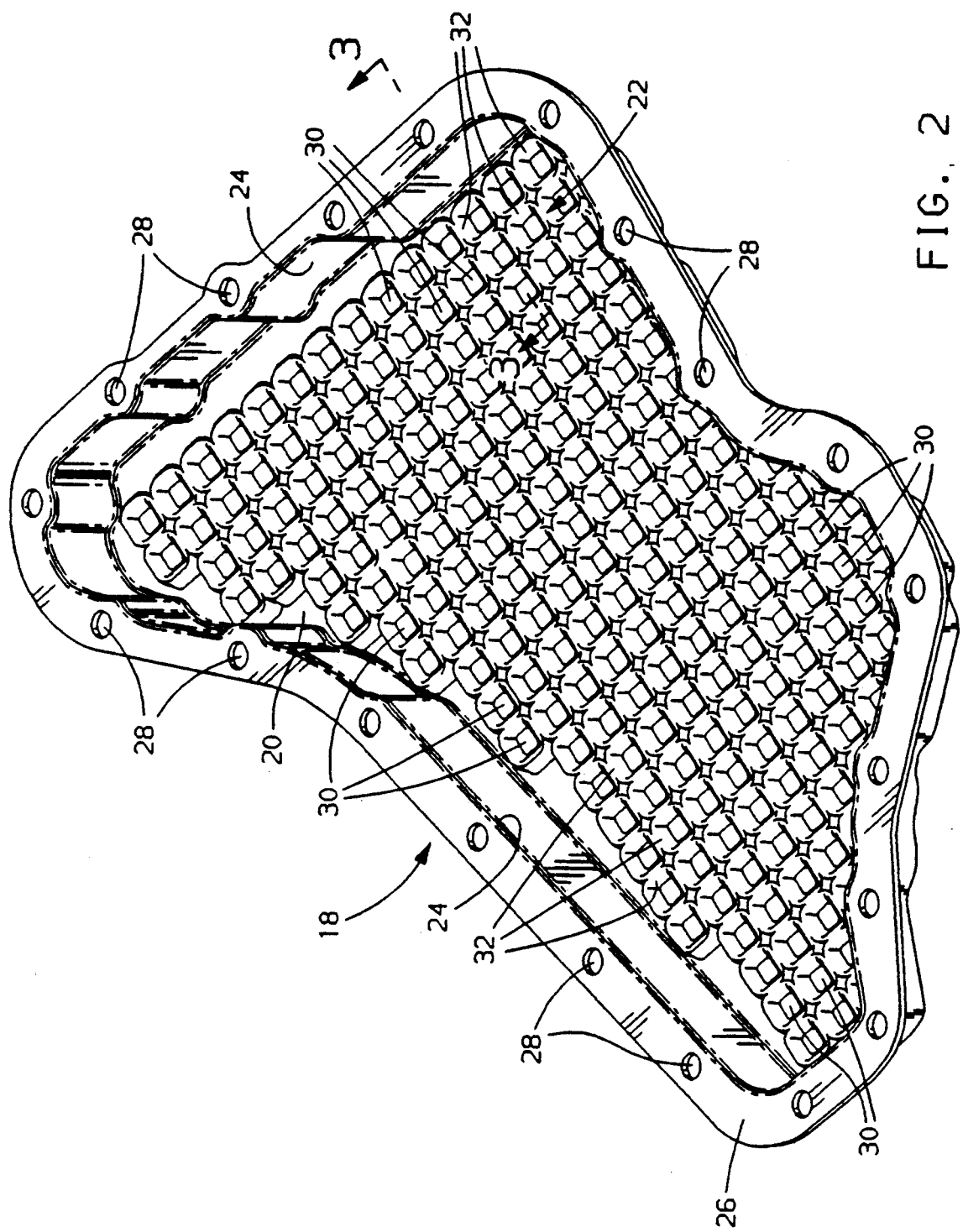
FIG. 2 is a perspective view of the bottom pan taken from the transmission in FIG. 1.

As seen in FIG. 2, the bottom pan 18 has a pan bottom wall 20 which is formed in a waffle pattern surface 22. The waffle pattern surface 22 is stamped or otherwise embossed into the pan bottom wall 20 when the bottom pan 18 is formed. The bottom pan 18 is generally formed in a drawing process in which a flat sheet of metal is deformed to provide the pan bottom wall 20, a pan sidewall 24 and a bolt and seal flange 26.

Either during the drawing process or in a subsequent process, a plurality of bolt holes 28 are formed in the flange 26. The waffle pattern surface 22 may be formed either during the drawing process or in a flat metal sheet prior to the drawing process.

Figure 3:
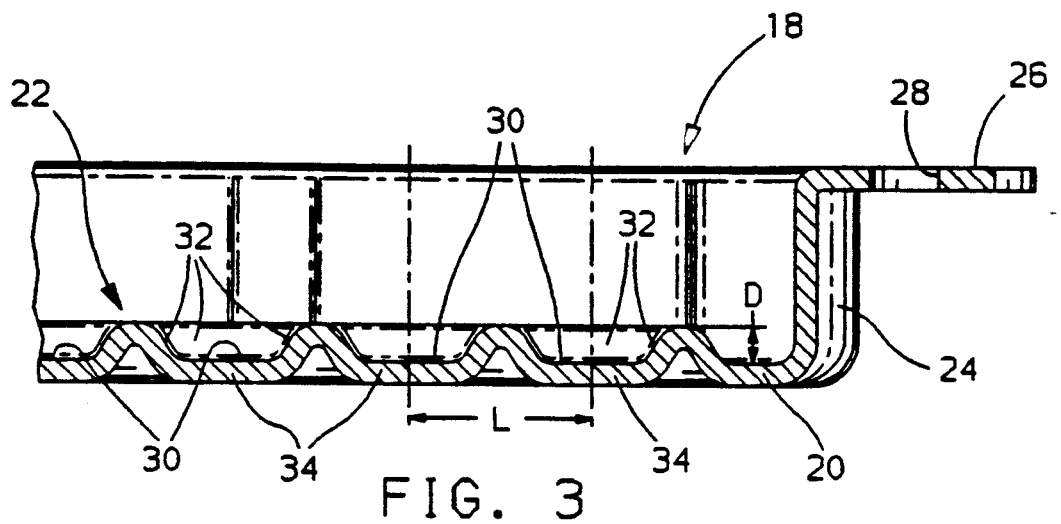
FIG. 3 is a sectional view taken along line 3—3 of FIG. 2.

As seen in FIG. 3, the waffle pattern surface 22 in the pan bottom wall 20 is comprised of a plurality of wells 30 which are substantially square in cross section. Each well 30 has four upstanding sidewalls 32 and a bottom wall 34. The sidewalls 32 of each well 30 is integral with the adjacent sidewall 32 of the adjacent well 30.

The sidewall 32 has a height dimension D which is preferably one-ninth of the length dimension L between the centers of adjacent bottom walls 34. It has been found that the waffle pattern with this ratio will provide a significant retention characteristic of debris which is very useful in the transmission 14.

Figure 4:
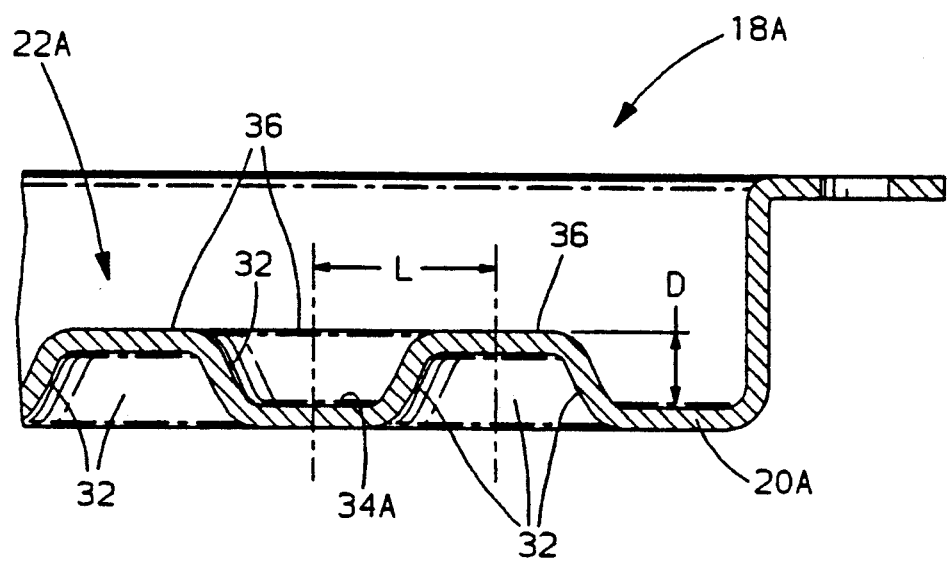
FIG. 4 is a sectional view similar to FIG. 3 showing another embodiment of the waffle pattern.

FIG. 4 depicts a modification of the waffle pattern shown as 22A, is formed in the pan bottom wall 20A of the bottom pan 18A. The waffle pattern 22A is similar to the waffle pattern 22 with the exception that the sidewalls 32 are connected with a top joining wall 36.

The top joining wall 36 defines a square surface similar to that defined in the bottom wall 34A.

The height to length ratio is substantially the same as that defined above for FIG. 3. That is, the height D of the sidewall 32 is one-ninth of the distance L between the center of bottom wall 34 and adjacent top adjoining wall 36. As pointed out above, this ratio of L to D of approximately nine has been found to be quite satisfactory in the prevention of debris from reaching the inlet of the control pump, not shown.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission bottom pan secured to the underside of a transmission housing, closing an opening therein and providing a fluid reservoir;

said bottom pan comprising:
upstanding sidewalls forming a continuous boundary;
a bottom wall defining the lowermost extent of the fluid reservoir including a waffle pattern formed in the bottom wall by displacing the bottom wall at selected locations, said waffle pattern comprising a waffle bottom wall, upstanding waffle sidewalls and a top joining wall contiguous with the waffle sidewalls of adjacent bottom walls, said waffle pattern encompassing at least 75 percent of the bottom wall.

2. The bottom pan defined in claim 1, wherein said top joining wall is a square and said upstanding walls of said waffle pattern have a dimension measured from the bottom wall to the top joining wall equal to at least one-ninth the dimension of a side length of the top joining wall.

3. The bottom pan defined in claim 1, wherein each top joining wall and each bottom wall are rectangular.

4. The bottom pan defined in claim 2, wherein each bottom wall is a square having dimensions substantially equal to the top joining wall.

* * * * *